(12) United States Patent
Lee (10) Patent No.: US 8,243,153 B2
(45) Date of Patent: Aug. 14, 2012

(54) PHOTOGRAPHING APPARATUS INCLUDING AT LEAST ONE SHAKE CORRECTION LENS AND METHOD ON PHOTOGRAPHING APPARATUS

(75) Inventor: Kyung-bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 12/635,919

(22) Filed: Dec. 11, 2009

(65) Prior Publication Data

US 2010/0157071 A1 Jun. 24, 2010

(30) Foreign Application Priority Data

Dec. 24, 2008 (KR) ........................ 10-2008-0133784

(51) Int. Cl.
*H04N 5/228* (2006.01)
(52) U.S. Cl. .................................................. 348/208.7
(58) Field of Classification Search ............ 348/208.99, 348/208.2, 208.4, 208.7, 208.8, 208.11; 396/13, 396/55, 421

See application file for complete search history.

(56) References Cited

U.S. PATENT DOCUMENTS

| | | | | |
|---|---|---|---|---|
| 5,416,558 A * | 5/1995 | Katayama et al. | ............... | 396/52 |
| 6,992,700 B1 * | 1/2006 | Sato et al. | .................. | 348/208.2 |
| 7,302,172 B2 * | 11/2007 | Seo | ................. | 396/55 |
| 7,443,422 B2 * | 10/2008 | Usui | ........................ | 348/208.11 |
| 7,692,687 B2 * | 4/2010 | Seo | ............. | 348/208.5 |
| 7,952,613 B2 * | 5/2011 | Sekino et al. | .............. | 348/208.7 |
| 7,957,631 B2 * | 6/2011 | Chang | ............................ | 396/55 |
| 7,978,222 B2 * | 7/2011 | Schneider | .................. | 348/208.5 |
| 2005/0270379 A1 * | 12/2005 | Seo | ............. | 348/208.5 |
| 2005/0276589 A1 * | 12/2005 | Seo | ................. | 396/55 |
| 2006/0061660 A1 * | 3/2006 | Brackmann | ................ | 348/208.1 |
| 2006/0082657 A1 * | 4/2006 | Meier | ........................ | 348/208.7 |
| 2006/0133786 A1 * | 6/2006 | Teramoto | ........................ | 396/55 |
| 2007/0292119 A1 * | 12/2007 | Lee | ................ | 396/55 |
| 2008/0260368 A1 * | 10/2008 | Chang | ............................ | 396/55 |
| 2008/0309773 A1 * | 12/2008 | Sekino et al. | .............. | 348/208.7 |
| 2009/0219402 A1 * | 9/2009 | Schneider | .................. | 348/208.7 |

* cited by examiner

*Primary Examiner* — Nicholas Giles
(74) *Attorney, Agent, or Firm* — Drinker Biddle & Reath LLP (57) ABSTRACT

Provided is a photographing apparatus including at least one shake correction lens through which image light is transmitted; a first driving unit moving the shake correction lens; an imaging device converting the image light transmitted through the shake correction lens to an electronic signal; a rotating unit rotating the imaging device about an optical axis of the image light; and a controller controlling the first driving unit and the rotating unit. A method on a photographing apparatus. The method including sensing shaking of the photographing apparatus; compensating for the shaking of the photographing apparatus by rotating an imaging device, the imaging device generating electrical signals from light incident to a subject image; and compensating for the shaking of the photographing apparatus by moving a shake correction lens in two directions, wherein light incident to the subject image passes through the shake correction lens and strikes the imaging device.

18 Claims, 7 Drawing Sheets

PHOTOGRAPHING APPARATUS INCLUDING AT LEAST ONE SHAKE CORRECTION LENS AND METHOD ON PHOTOGRAPHING APPARATUS

CROSS-REFERENCE TO RELATED PATENT APPLICATION

This application claims the benefit of Korean Patent Application No. 10-2008-0133784, filed on Dec. 24, 2008 in the Korean Intellectual Property Office, the entire disclosure of which is incorporated herein by reference.

BACKGROUND OF THE INVENTION

1. Field of the Invention

The present invention relates to a photographing apparatus, and more particularly, to a photographing apparatus correcting a shake during photographing.

2. Description of the Related Art

Consumers are increasingly demanding high quality still images and moving images from photographing apparatuses.

Image quality may be diminished if the photographing apparatus is shaken during photographing. One method to compensate for shake during photographing is an electronic shake correction method. The electronic shake correction method may improve image quality by detecting the shake of the photographing apparatus from a series of photographed images and then adjusting the locations and colors of the photographed images to compensate for the detected shake.

However, images generated with the electronic shake correction may have afterimages.

SUMMARY OF THE INVENTION

The present invention provides a photographing apparatus having a high-performance shake correction function.

According to an aspect of the present invention, there is provided a photographing apparatus including at least one shake correction lens through which image light is transmitted; a first driving unit moving the shake correction lens; an imaging device converting the image light transmitted through the shake correction lens to an electronic signal; a rotating unit rotating the imaging device about an optical axis of the image light; and a controller controlling the first driving unit and the rotating unit.

The first driving unit may move the shake correction lens in a perpendicular direction to the optical axis of the image light.

The first driving unit including a pair of actuators, wherein a portion of each of the pair of actuators may be connected to the shake correction lens.

The first driving unit may include at least one of an ultrasonic motor, a voice coil motor and a step motor.

The imaging device may include a charge coupled device (CCD) or a complementary metal oxide semiconductor (CMOS).

The rotating unit may include a frame having a rotation hole; a second driving unit mounted in the frame, and including an operating unit moving linearly; a rotation guiding unit is installed in the rotation hole so as to be capable of rotating, the rotation guiding unit where the imaging device is mounted; and a link unit connected to the rotating guiding unit, and receiving power from the operating unit of the second driving unit to rotate the rotation guiding unit.

The second driving unit may include at least one of an ultrasonic motor, a voice coil motor and a step motor.

The rotation guiding unit may include a rotation connection unit connected to the link unit, a slot may be formed in the link unit, and a connection pin installed in the rotation connection unit may pass through the slot so that the link unit and the rotation connection unit are connected to each other.

A linear motion of the link unit may be converted to a rotation motion of the rotation guiding unit by the connection pin.

The photographing apparatus may further include at least one sensor unit measuring a shake of the photographing apparatus and transmitting a result of the measuring to the controlling unit.

The at least one sensor unit may include a gyro sensor measuring rotation motion.

According to another aspect of the present invention, there is provided a photographing apparatus including at least one lens group through which image light is transmitted; an imaging device converting the image light transmitted through the lens group to an electronic signal; a rotating unit rotating the imaging device about an optical axis of the image light; and a controller controlling the rotating unit.

The imaging device may include a CCD or a CMOS.

The rotating unit may include a frame comprising a rotation hole; a driving unit mounted in the frame, and including an operating unit moving linearly; a rotation guiding unit is installed in the rotation hole so as to be capable of rotating, the rotation guiding unit where the imaging device is mounted; and a link unit connected to the rotating guiding unit, and receiving power from the operating unit of the second driving unit to rotate the rotate guiding unit.

The driving unit may include at least one of an ultrasonic motor, a voice coil motor and a step motor.

The rotation guiding unit may include a rotation connection unit connected to the link unit, wherein a slot may be formed in the link unit, and a connection pin installed in the rotation connection unit may pass through the slot so that the link unit and the rotation connection unit are connected to each other.

A linear motion of the link unit may be converted to a rotation motion of the rotation guiding unit by the connection pin.

The photographing apparatus may further include at least one sensor unit measuring a shake of the photographing apparatus and transmitting a result of the measuring to the controlling unit.

The at least one sensor unit may include a gyro sensor measuring rotary motion.

A method on a photographing apparatus is provided. The method including sensing shaking of the photographing apparatus; compensating for the shaking of the photographing apparatus by rotating an imaging device, the imaging device generating electrical signals from light incident to a subject image; and compensating for the shaking of the photographing apparatus by moving a shake correction lens in two directions, wherein light incident to the subject image passes through the shake correction lens and strikes the imaging device.

BRIEF DESCRIPTION OF THE DRAWINGS

The above and other features and advantages will become more apparent by describing in detail exemplary embodiments with reference to the attached drawings in which.

DETAILED DESCRIPTION OF THE INVENTION

Therefore, there is a need in the art for photographing apparatuses with shake correction for improving the clarity of images which may be caused by a user's hand shaking or external shocks.

Figure 1:
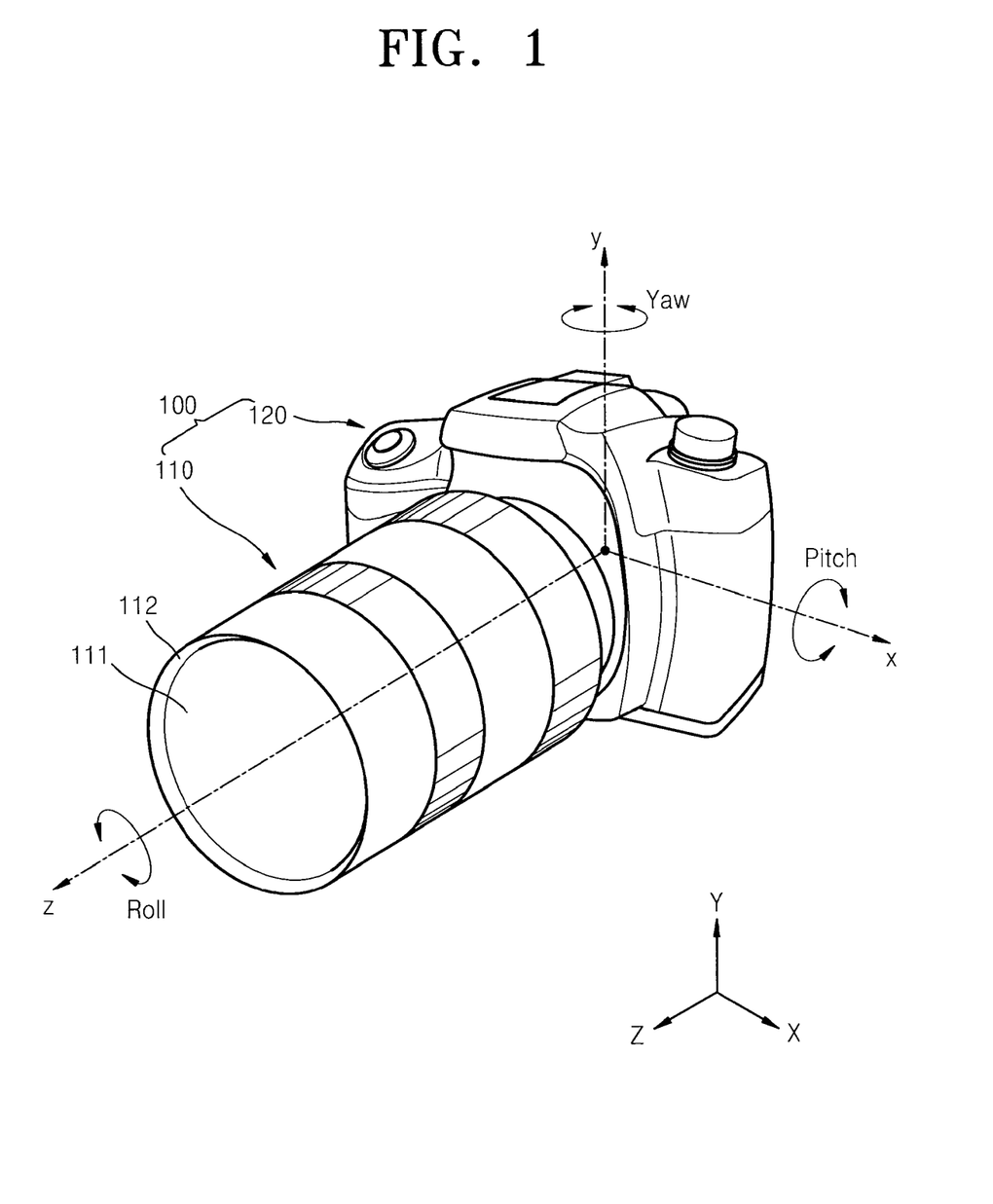
FIG. 1 is a perspective view of an example of a photographing apparatus according to an embodiment of the present invention.
Figure 2:
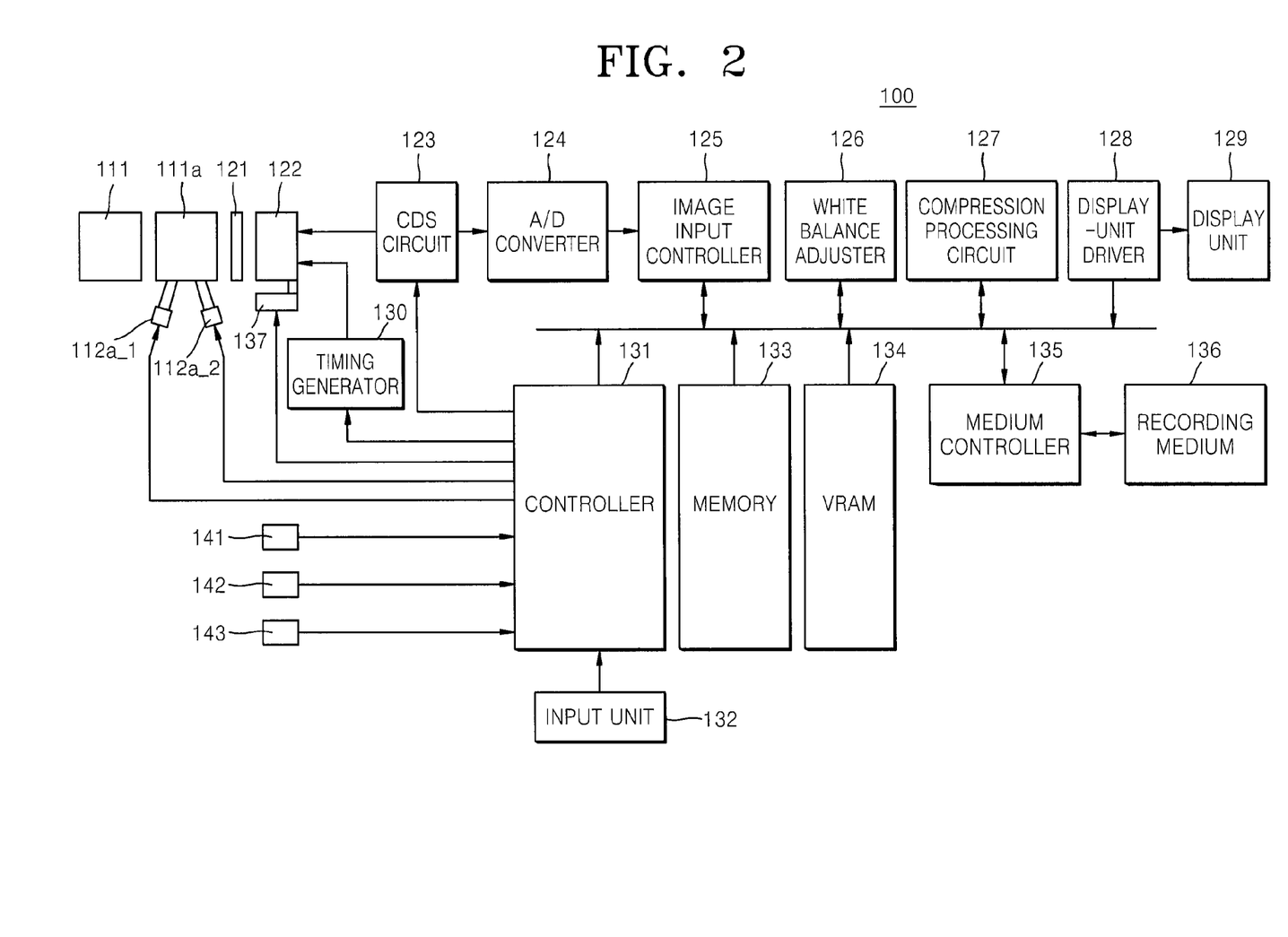
FIG. 2 is a block diagram illustrating an example of internal elements of the photographing apparatus of FIG. 1.
Figure 3:
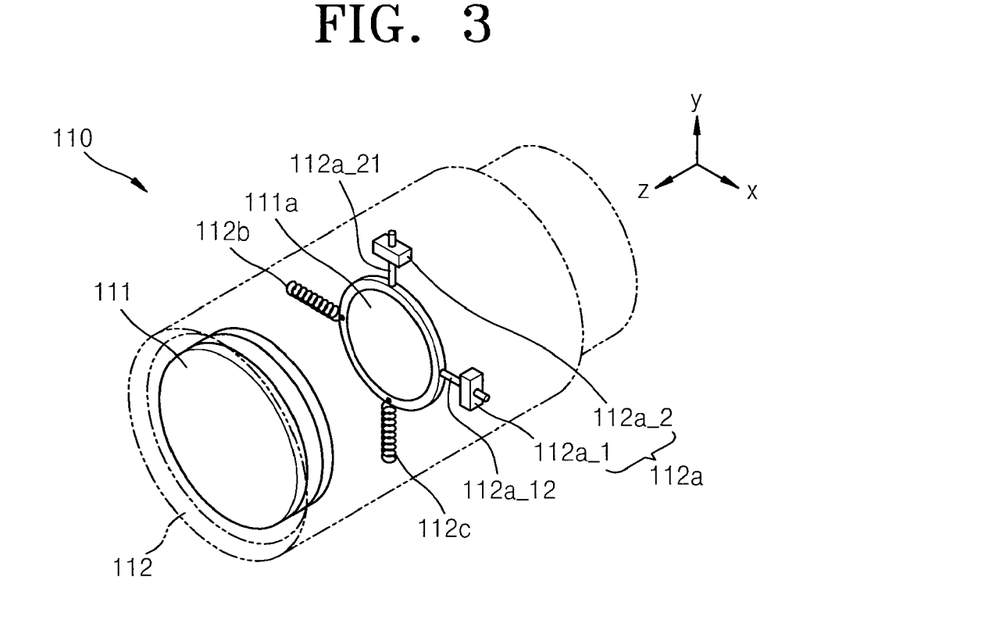
FIG. 3 is a perspective view of an example of a lens unit of the photographing apparatus of FIG. 1.

FIG. 1 is a perspective view of an example of a photographing apparatus 100. FIG. 2 is a block diagram illustrating an example of internal elements of the photographing apparatus 100 of FIG. 1. FIG. 3 is a perspective view of an example of a lens unit 110 of the photographing apparatus 100 of FIG. 1.

Referring to FIG. 1, the photographing apparatus 100 is a single-lens reflex digital camera from which a lens unit 110 can be detached, if necessary.

As a whole, the photographing apparatus 100 includes the lens unit 110 and a main body 120.

The lens unit 110 includes a lens group 111 and a lens frame 112, and transfers image light bouncing off a subject to be photographed to the main body 120.

The lens group 111 transmits the image light bouncing off the subject, and includes a zoom lens, a focus lens, an iris, and so on. The zoom lens is moved along an optical axis to vary a focal length, which may vary the size of the subject image. The focus lens focuses a focal point. The iris adjusts an amount of light to be incident on the imaging device in order to photograph the subject.

An example of a shake correction lens 111*a* is disposed in the lens group 111, as illustrated in FIG. 3. The shake correction lens 111*a* corrects a shake of the photographing apparatus 100 by controlling the motion of the shake correction lens 111*a* in a direction so as to offset the shake of the photographing apparatus 100.

The lens group 111 includes at least one single shake correction lens. In embodiments, the lens group 111 may include at least two shake correction lenses.

The lens group 111 is mounted in the lens frame 112. A first driving unit 112*a*, a first elastic member 112*b*, and a second elastic member 112*c*, which control the motion of the shake correction lens 111*a*, are disposed in the lens frame 112.

The first driving unit 112*a* includes a first actuator 112*a*_1 and a second actuator 112*a*_2. Each of the first actuator 112*a*_1 and the second actuator 112*a*_2 includes a voice coil motor (VCM).

The first driving unit 112*a* includes two actuators, that is, the first actuator 112*a*_1 and the second actuator 112*a*_2. In embodiments, the number of actuators included in the first driving unit 112*a* may be one actuators or three or more actuators.

The first driving unit 112*a* includes a VCM. In embodiments, the first driving unit 112*a* may include an ultrasonic motor, or alternatively, may include a step motor.

An end of an element 112*a*_12 of the first actuator 112*a*_1 and an end of an element 112*a*_21 of the second actuator 112*a*_2 are connected to the shake correction lens 111*a*. Since the first actuator 112*a*_1 and the second actuator 112*a*_2 are disposed in a perpendicular direction to each other, and the first actuator 112*a*_1 and the second actuator 112*a*_2 move the shake correction lens 111*a* in x-axis and y-axis directions, respectively.

The first actuator 112*a*_1 and the second actuator 112*a*_2 are mounted in the lens frame 112 so as to be capable of rotating by a predetermined angle. To achieve this, the first actuator 112*a*_1 and the second actuator 112*a*_2 are mounted to the lens frame 112 by a first mounting unit 112*a*_3 and a second mounting unit 112*a*_4 using a hinge structure, respectively.

The first elastic member 112*b* and the second elastic member 112*c* restore a position of the shake correction lens 111*a* to a start position. Together with the first actuator 112*a*_1 and the second actuator 112*a*_2, the first elastic member 112*b* and the second elastic member 112*c* control the motion of the shake correction lens 111*a* in the x-axis and y-axis directions.

Each of the first elastic member 112*b* and the second elastic member 112*c* includes a cylindrical coiled spring. One end of each of the first elastic member 112*b* and the second elastic member 112*c* is mounted in the lens frame 112, and other end of each of the first elastic member 112*b* and the second elastic member 112*c* is mounted to the shake correction lens 111*a*.

According to the present embodiment, each of the first elastic member 112*b* and the second elastic member 112*c* includes a cylindrical coiled spring. In embodiments, the shapes and materials of the first elastic member 112*b* and the second elastic member 112*c* are not particularly limited as long as the first elastic member 112*b* and the second elastic member 112*c* are sufficiently elastic.

According to the present embodiment, the lens unit 110 includes the first elastic member 112*b* and the second elastic member 112*c*. In embodiments, the lens unit 110 may not include the first elastic member 112*b* and the second elastic member 112*c*.

As illustrated in FIG. 2, the main body 120 includes a shutter 121, an imaging device 122, a correlated double sampling (CDS) circuit 123 integrated with an amplifier, an analog/digital (A/D) converter 124, an image input controller 125, a white balance adjuster 126, a compression processing circuit 127, a display-unit driver 128, a display unit 129, a timing generator 130, a controller 131, an input unit 132, a memory 133, a video random access memory (VRAM) 134, a medium controller 135, a recording medium 136, a rotating unit 137, a first sensor 141, a second sensor 142, a third sensor 143, and so on.

The shutter 121 controls image light incident on the imaging device 122.

The imaging device 122 is disposed at a position where the image light transmitted through the lens group 111 is imaged, and thus the imaging device 122 converts an imaged image to an electronic signal.

The imaging device 122 may include a charge couple device (CCD). In embodiments, the imaging device 122 may include a complementary metal oxide semiconductor (CMOS), or an image sensor.

The CDS circuit 123 is a circuit including a CDS circuit integrated with an amplifier. The CDS circuit is a kind of a sampling circuit removing noise of an electronic signal output from the imaging device 122, and the amplifier removes the noise and then amplifies the electronic signal. In the present embodiment, the circuit including the CDS circuit and the amplifier constitutes the CDS circuit 123. In embodiments, the CDS circuit and the amplifier may be separately configured by circuits.

The A/D converter 124 converts an analog electronic signal generated by the imaging device 122 to a digital signal.

The image input controller 125 transfers a digital imaging signal to the controller 131.

The white balance adjuster 126 is a circuit adjusting a white balance value by using photographed image data output from the imaging device 122.

The white balance adjuster 126 may be connected via a separate circuit to the controller 131. In embodiments, the white balance adjuster 126 may be integrated in the controller 131.

In addition, the white balance adjuster 126 may be formed as hardware. In embodiments, the white balance adjuster 126 may be formed as software.

The compression processing circuit 127 performs compression-processing in which the photographed image data is compressed in an appropriate format that may be reversible or irreversible. Examples of the appropriate format may include a joint photographic experts group (JPEG) type or a JPEG 2000 type.

The display unit 129 includes a liquid crystal display (LCD) device, and displays a live view prior to photographing, various images for setting the photographing apparatus 100, a photographed image, and so on. The photographed image data or various pieces of information of the photographing apparatus 100 are displayed on the display unit 129 via the display-unit driver 128.

In the present embodiment, the display unit 129 includes an LCD device. In an embodiment, the display unit 129 may include an organic light emitting diode (OLED), a field emission display (FED) device, or the like.

The timing generator 130 outputs a timing signal that is input to the imaging device 122. A shutter velocity is determined according to the timing signal output from the timing generator 130. Driving of the imaging device 122 is controlled by the timing signal output from the timing generator 130, and the image light of the subject is incident on the imaging device 122 during the driving of the imaging device 122. Thus, the electronic signal corresponding to the photographed image data is generated.

The controller 131 performs command from a signal system such as the first driving unit 112a, the imaging device 122, the CDS circuit 123 and the rotating unit 137 of the lens unit 110, and performs a manipulation command from a manipulation unit such as the input unit 132. In the present embodiment, the photographing apparatus 100 includes a single controller 131. In embodiments, the photographing apparatus 100 may include a plurality of controllers.

The controller 131 receives data regarding a shake of the photographing apparatus 100 from the first sensor 141 (FIG. 2), the second sensor 142, and the third sensor 143, and generates a control signal for correcting the shake of the photographing apparatus 100. Then, the controller 131 controls the first driving unit 112a and a second driving unit 137b.

In addition, the controller 131 performs an image processing function. That is, the controller 131 processes the photographed image data output from the imaging device 122. For example, the controller 131 performs gamma correction of the photographed image data output from the imaging device.

Gamma correction refers to encoding information to agree with nonlinearity of the human sight. That is, since the human sight responds nonlinearly to brightness according to Weber's law, when brightness is linearly recorded in photographed image data with a limited bit depth, posterization occurs. Thus, in order to obtain the good image quality with the limited bit depth, the photographed image data is encoded using a nonlinear function, which is referred to as gamma correction.

The controller 131 performs gamma correction by using a gamma curve with respect to an image signal input to the controller 131, and then outputs the image signal. For example, the controller 131 calibrates an input brightness level of 12 bits image signal and then outputs the 8 bits of brightness level.

The input unit 132 also operates as a photographing mode selecting unit. In addition, members for manipulating the photographing apparatus 100 or performing various settings during photographing are disposed in the input unit 132. The members disposed in the input unit 132 includes a power button, a cross key and a selection button, which are used to select a photographing mode and a photographing drive mode and to set an effect parameter, and a shutter button for initiating manipulation of photographing.

The shape and type of the input unit 132 may not be particularly limited. The input unit 132 may be embodied as a button-shaped device or a touch screen device linked to the display unit 129.

The memory 133 is an example of an image storage unit, and temporarily stores photographed image data or data required to operate the photographing apparatus 100. The memory 133 has a capacity for storing a plurality of images. An image is written to/read from the memory 133 under the control of the image input controller 125.

The VRAM 134 maintains contents displayed on the display unit 129. The resolution and the maximum number of colors of the display unit 129 vary with the capacity of the VRAM 134.

The recording medium 136 is an example of an image recording unit, and records the photographed image. The photographed image is input to/output from the recording medium 136 under the control of the medium controller 135. The recording medium 136 may be a secure digital (SD) card and a multimedia card (MMC) for storing data.

Figure 6:
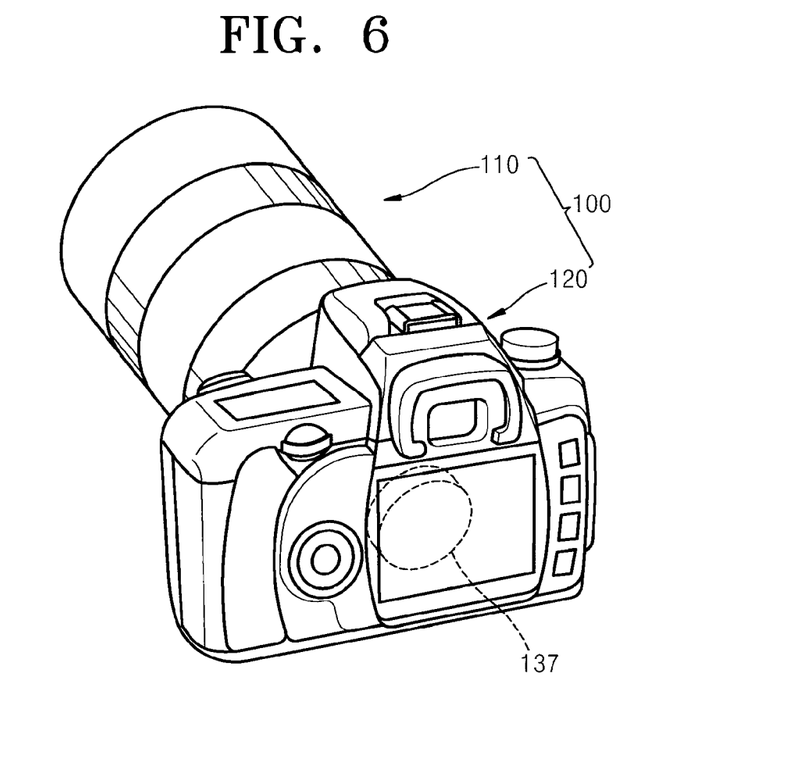
FIG. 6 is a perspective back view of an example of a photographing apparatus.

The rotating unit 137 rotates the imaging device 122. As illustrated in FIG. 6, the rotating unit 137 is disposed in the main body 120.

Figure 7:
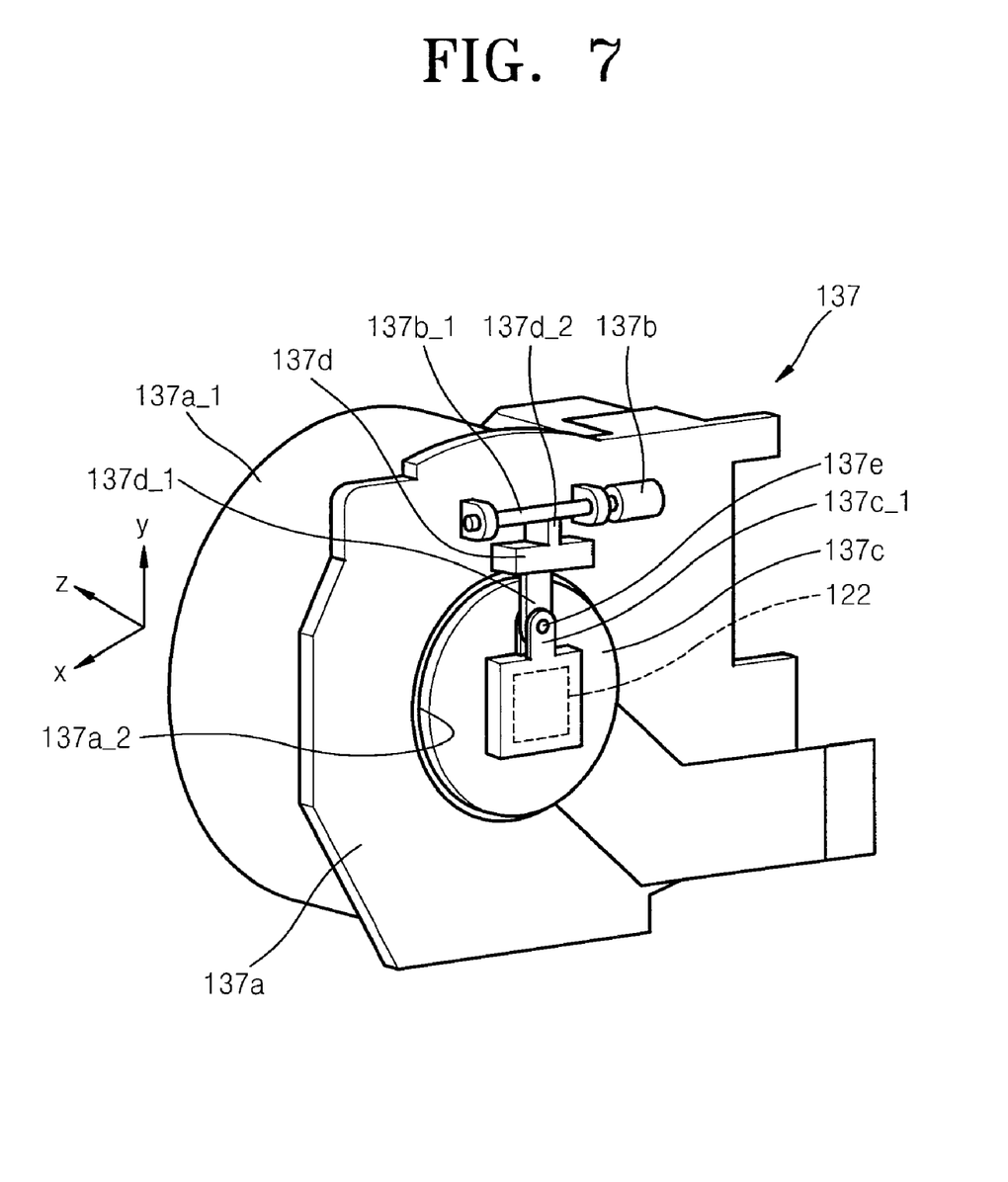
FIG. 7 is a perspective view of an example of a rotating unit of a photographing apparatus.

As illustrated in FIG. 7, the rotating unit 137 includes a frame 137a, the second driving unit 137b, a rotation guiding unit 137c, and a link unit 137d.

FIG. 7 is a perspective view of an example of the rotating unit 137 of the photographing apparatus 100.

A barrel 137a_1 including the shutter 121 disposed therein is disposed in the frame 137a. A rotation hole 137a_2 is formed in the center of the frame 137a.

The second driving unit 137b includes an ultrasonic motor, and is mounted in the frame 137a. An operating unit 137b_1 disposed in the second driving unit 137b moves linearly.

In the present embodiment, the second driving unit 137b includes an ultrasonic motor. In embodiments, the second driving unit 137b may include a voice coil motor, or alternatively, may include a step motor.

The rotate guiding unit 137c has a cylindrical shape, and is configured so that the circumference of the rotate guiding unit 137c is inserted in the rotation hole 137a_2 so as to be capable of rotating. In addition, the imaging device 122 is mounted on the rotation guiding unit 137c. A rotation connection unit 137c_1 is formed on a portion of the rotation guiding unit 137c.

The link unit 137*d* receives power from the operating unit 137*b*_1 of the second driving unit 137*b*, and then rotates the rotation guiding unit 137*c*. To achieve this, a first portion 137*d*_1 of the link unit 137*d* is connected to the rotation connection unit 137*c*_1, and a second portion 137*d*_2 is connected to the operating unit 137*b*_1 of the second driving unit 137*b*. Thus, the ink unit 137*d* is moved by the motion of the operating unit 137*b*_1.

Figure 8:
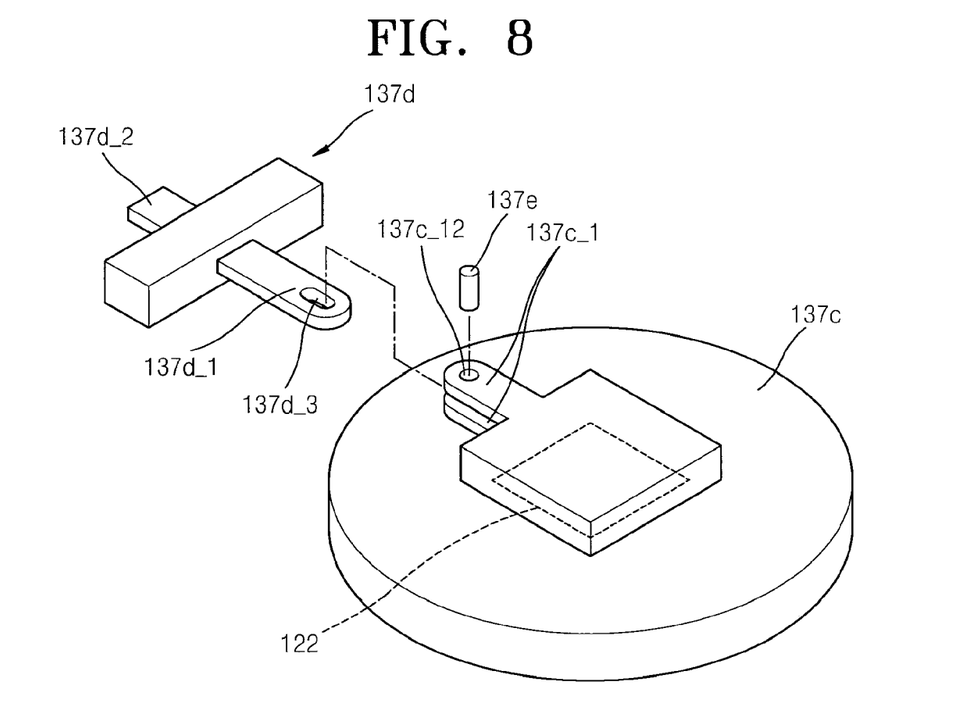
FIG. 8 is an exploded perspective view illustrating an example of a method of connecting a link unit to a rotate connection unit.

Referring to FIG. 8, a structure in which the first portion 137*d*_1 of the link unit 137*d* is connected to the rotation connection unit 137*c*_1 will be described.

FIG. 8 is an exploded perspective view illustrating an example of a method of connecting the link unit 137*d* to the rotation connection unit 137*c*_1.

A slot 137*d*_3 is formed in the first portion 137*d*_1 of the link unit 137*d*, and a fixing hole 137*c*_12 is formed in the rotation connection unit 137*c*_1.

A connection pin 137*e* is inserted into the slot 137*d*_3 to be mounted in the fixing hole 137*c*_12, and thus the rotation guiding unit 137*c* can be rotated by the linear motion of the link unit 137*d*. When the link unit 137*d* moves, the connection pin 137*e* comes in contact with an inner wall of the slot 137*d*_3 to slide along the inner wall of the slot 137*d*_3. Thus, a linear motion of the link unit 137*d* is converted to a rotary motion of the rotation guiding unit 137*c*.

In the rotating unit 137, the rotation guiding unit 137*c* rotates by a limited angle due to structural characteristics of the rotating unit 137. Thus, when a photographing apparatus is designed, a rotating angle for shake correction is determined, and then a displacement of the linear motion of the link unit 137*d* and the length of the slot 137*d*_3 is considered in order to obtain the rotating angle for shake correction.

The linear motion of the operating unit 137*b*_1 of the second driving unit 137*b* is converted to a rotation motion of the rotation guiding unit 137*c*. In embodiments, the detailed construction of the rotating unit 137 is not particularly limited as long as the rotating unit 137 can rotate the imaging device 122. For example, in the rotating unit 137, a step motor having a rotary axis can be used as the second driving unit 137*b*, a power transfer device such as a gear device or a belt device is used as the rotary axis, and thus the rotation guiding unit 137*c* on which the imaging device 122 is disposed can be rotated.

The first sensor 141 (FIG. 2), the second sensor 142, and the third sensor 143 measure the shake degree of the photographing apparatus 100. To achieve this, each of the first sensor 141, the second sensor 142, and the third sensor 143 may include an acceleration sensor, a gyro sensor, or the like.

The kind and operating principle of each of the first sensor 141, the second sensor 142 and the third sensor 143 are not particularly limited as long as the first sensor 141, the second sensor 142 and the third sensor 143 can measure the motion of the photographing apparatus 100. For example, a displacement sensor, a velocity sensor, an angular velocity sensor or angular acceleration sensor may be used as each of the first sensor 141, the second sensor 142 and the third sensor 143. Preferably, a gyro sensor may be used as each of the first sensor 141, the second sensor 142 and the third sensor 143 in order to measure the rotation shake of the photographing apparatus 100.

According to the present embodiment, three sensors, that is, the first sensor 141 (FIG. 2), the second sensor 142 and the third sensor 143 are used, but the present invention is not limited thereto. That is, the number of sensors is not particularly limited. For example, a single sensor may be used as long as the single sensor can detect the shake of the photographing apparatus 100 in all directions. In embodiments, at least four sensors may be used.

Hereinafter, a shake correction operation of the photographing apparatus 100 will be described in detail.

The photographing apparatus 100 may shake due to a user's hand shake, etc., during photographing. At this time, the shake may be analyzed in six directions.

That is, as illustrated in FIG. 1, the shake of the photographing apparatus 100 can be analyzed in a translation motion based on a XYZ fixed coordinate system, and a rotation motion based on x, y and z axes of an xyz moving coordinate system having the origin at the photographing apparatus 100. The rotation motion having may be more important than the translation motion in terms of the hand shake. The rotation motion can be expressed by Pitch, that is, rotation about the x-axis, Yaw, that is rotation about the y-axis, and Roll, that is, rotation about the z-axis.

Thus, the photographing apparatus 100 uses a three-axis shake correction method in order to correct a shake. That is, the motion of the shake correction lens 111*a* of the lens unit 110 is controlled, and simultaneously the rotation motion of the imaging device 122 disposed in the main body 120 is controlled. In other words, the former is a two-axis shake correction method, and the latter is a one-axis shake correction method. Thus, overall, the photographing apparatus 100 uses the three-axis shake correction method.

In a shake correction mode of the photographing apparatus 100, the two-axis shake correction method of controlling the motion of the shake correction lens 111*a* and the one-axis shake correction method of controlling the rotation motion of the imaging device 122 may be simultaneously performed. Hereinafter, for convenience of description, the two-axis shake correction method of controlling the motion of the shake correction lens 111*a* will be described, and then the one-axis shake correction method of controlling the rotation motion of the imaging device 122 will be described.

Figure 4:
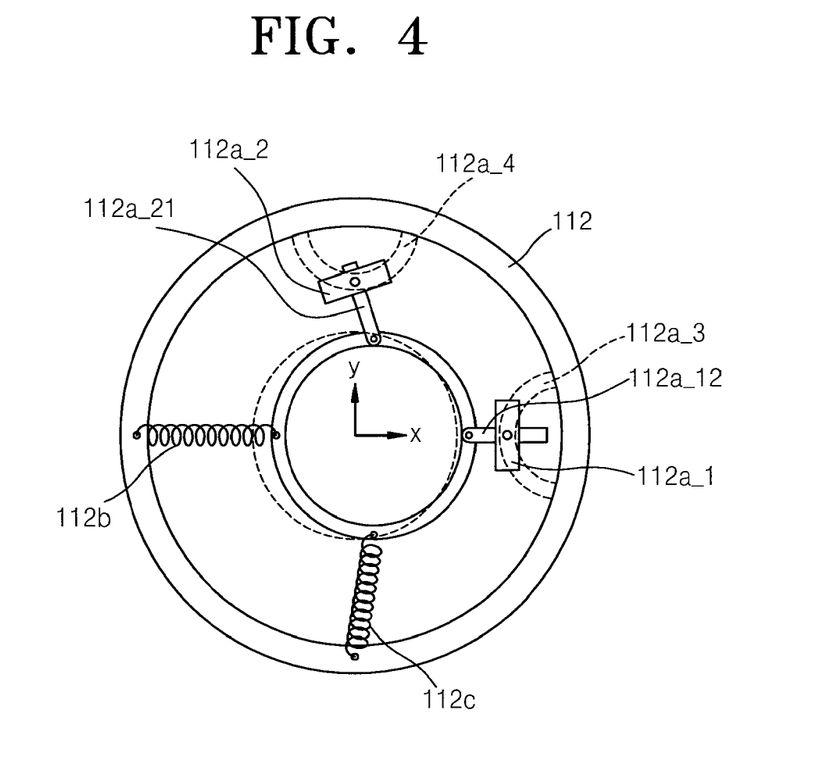
FIGS. 4 and 5 illustrate an example where a shake correction lens is moved in order to correct a shake of a photographing apparatus.
Figure 5:
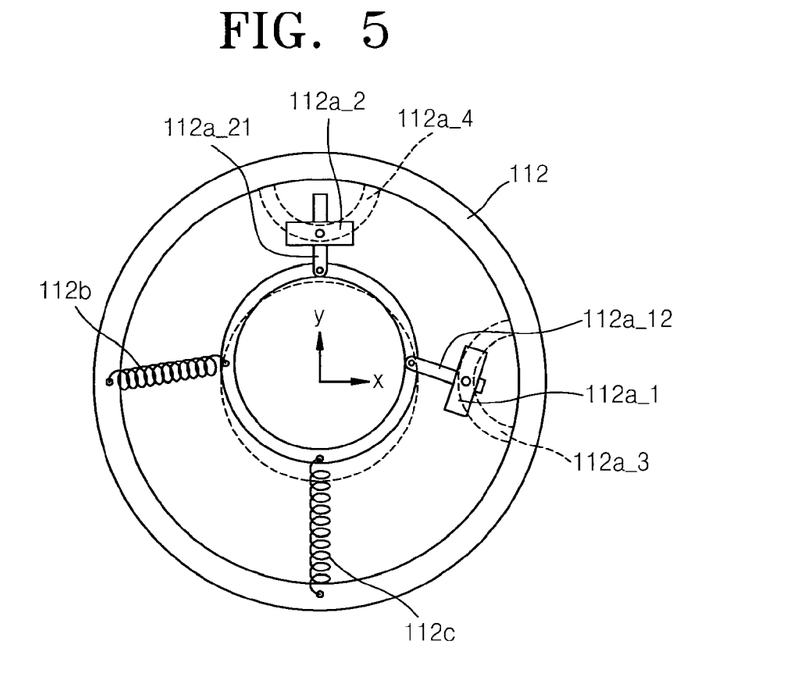

With reference to FIGS. 4 and 5, the two-axis shake correction method of controlling the motion of the shake correction lens 111*a* will now be described.

FIGS. 4 and 5 illustrate an example where the shake correction lens 111*a* is moved in order to correct a shake of the photographing apparatus 100.

In a shake correction mode of the photographing apparatus 100, the first sensor 141 and the second sensor 142 measure the shake of the photographing apparatus 100, and transmit the measurement result to the controller 131. At this time, the first sensor 141 and the second sensor 142 primarily measure Pitch and Yaw.

The controller 131 calculates data received from the first sensor 141 and the second sensor 142, and then operates the first driving unit 112*a*. The first driving unit 112*a* may move the first actuator 112*a*_1 and the second actuator 112*a*_2 in a direction so as to correct the shake of the photographing apparatus 100. In this example, the first driving unit 112*a* moves the shake correction lens 111*a* in a perpendicular direction with respect to a z-axis direction that is an optical axis direction. That is, the first driving unit 112*a* moves the shake correction lens 111*a* on the x-y plane.

For example, as illustrated in FIG. 4, if the shake correction lens 111*a* is intended to be moved in a positive direction of the x-axis in order to correct the shake of the photographing apparatus 100, the controller 131 operates the operator 112*a*_12 of the first actuator 112*a*_1 so as to move the shake correction lens 111*a* in a positive direction of the x-axis.

In addition, for example, as illustrated in FIG. 5, if the shake correction lens 111*a* is intended to be moved in a positive direction of the y-axis in order to correct the shake of the photographing apparatus 100, the controller 131 operates the operator 112*a*_21 of the second actuator 112*a*_2 so as to move the shake correction lens 111*a* in a positive direction of the y-axis.

In the above example, the example where the shake correction lens 111*a* is moved in the positive directions of the x-axis and y-axis in order to correct the shake of the photographing apparatus 100 has been described. Also, the shake correction lens 111*a* is moved in a negative direction of the x-axis and y-axis in the same manner as in the above example except that the shake correction lens 111*a* is moved in an opposite direction to in the above example.

In the above example, the movement of the shake correction lens 111*a* in the x-axis direction and the y-axis direction to correct the shake of the photographing apparatus 100 have been separately described. However, when the photographing apparatus 100 is shaken, the shake correction lens 111*a* may be simultaneously moved in the x-axis and y-axis directions. In this case, the controller 131 may simultaneous control both the first actuator 112*a*_1 and the second actuator 112*a*_2.

When the shake correction lens 111*a* is moved from an initial position, the first elastic member 112*b* and the second elastic member 112*c* are pressed or pulled to store or release elastic potential energy. Then, when the shake correction lens 111*a* is not shaken, the shake correction lens 111*a* is restored to the initial position while the elastic potential energy stored in the first elastic member 112*b* and the second elastic member 112*c* is released.

With respect to FIGS. 9 through 11, the one-axis shake correction method of controlling the rotary motion of the imaging device 122 will now be described.

Figure 9:
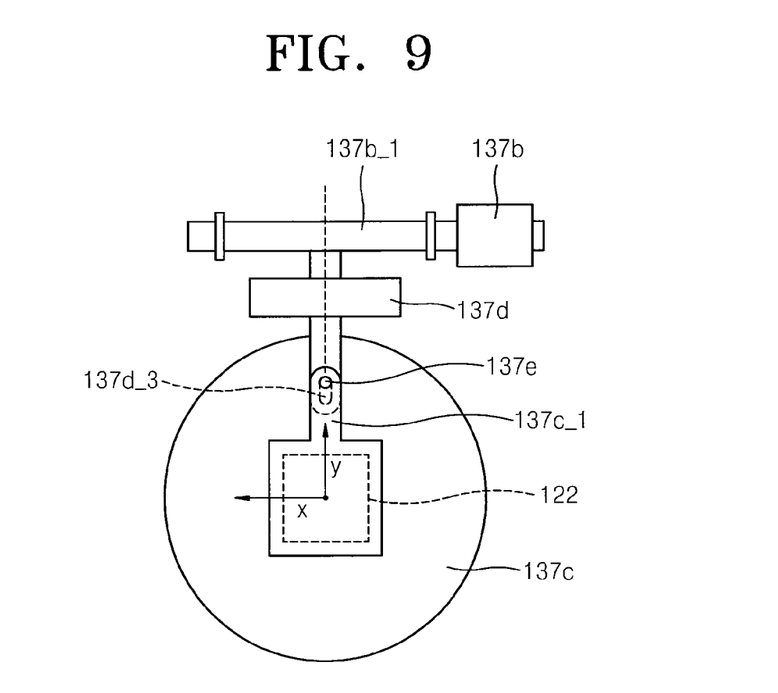
FIGS. 9 through 11 illustrate an example where an example of an imaging device is moved in order to correct a shake thereof.
Figure 10:
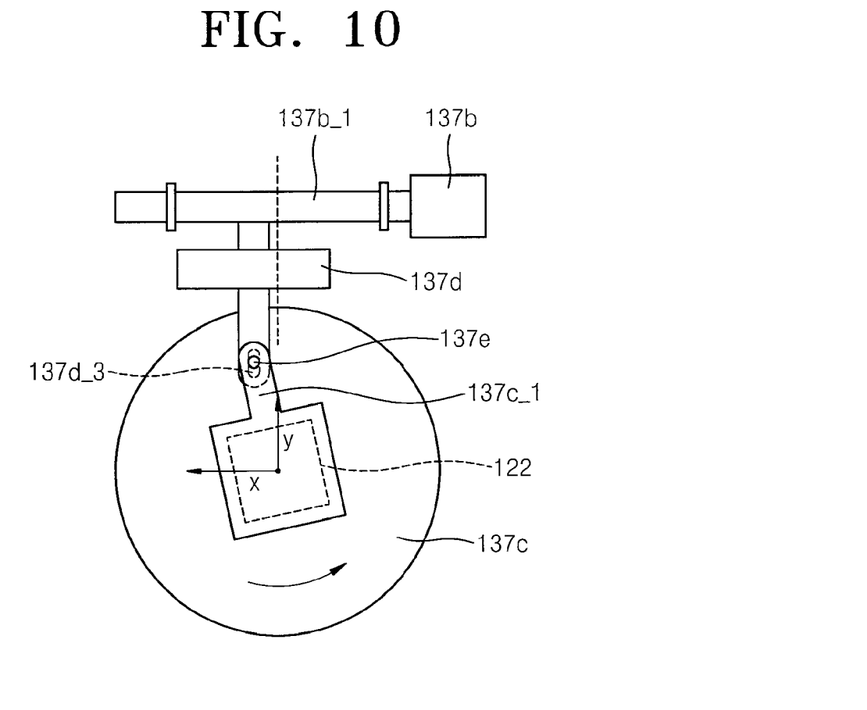
Figure 11:
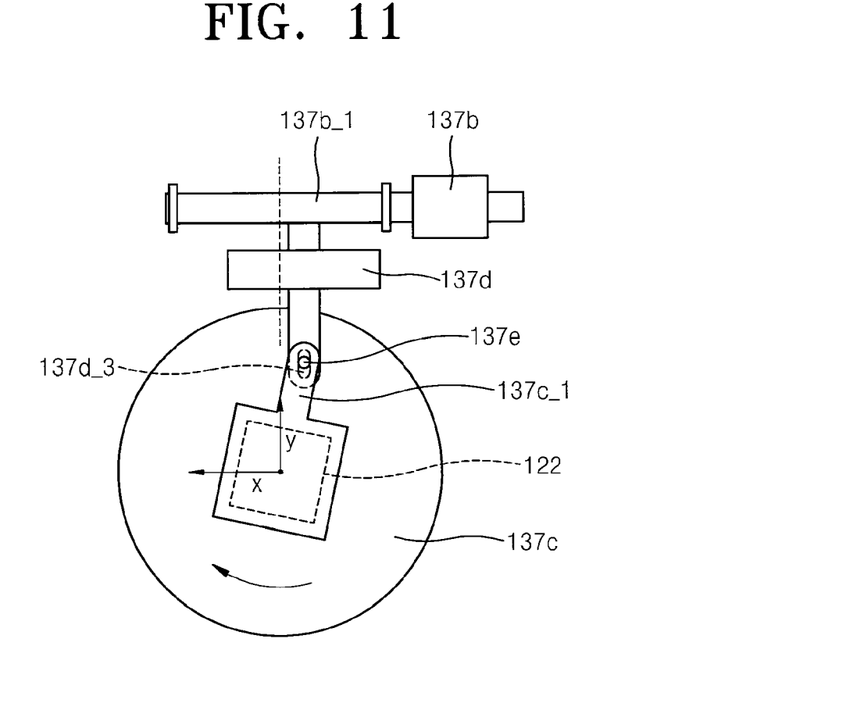

FIGS. 9 through 11 illustrate an example where the imaging device 122 is moved in order to correct the shake of the photographing apparatus 100.

First, in a shake correction mode of the photographing apparatus 100, when the photographing apparatus 100 is not shaken, the controller 131 may not operate the second driving unit 137*b*, and the imaging device 122 does not rotate, as illustrated in FIG. 9.

When the photographing apparatus 100 is shaken, the third sensor 143 measures the rotation shake of the photographing apparatus 100, and then transmits the measurement result to the controller 131. At this time, the third sensor 143 primarily measures Roll.

The controller 131 calculates data received from the third sensor 143, and then operates the second driving unit 137*b* in a direction so as to correct the shake of the photographing apparatus 100.

For example, as illustrated in FIG. 10, if the imaging device 122 is intended to be rotated counterclockwise in order to correct the shake of the photographing apparatus 100, the controller 131 controls and moves the operating unit 137*b*_1 of the second driving unit 137*b* in a positive direction of the x-axis. When the operating unit 137*b*_1 is moved in the positive direction of the x-axis, the link unit 137*d* is also moved in the positive direction of the x-axis. Thus, the connection pin 137*e* slides along an inner wall of the slot 137*d*_3, and the rotation guiding unit 137*c* rotates counterclockwise. That is, the rotation guiding unit 137*c* is bounded by the rotation hole 137*a*_2 so that the rotation guiding unit 137*c* rotates while being inserted into the rotation hole 137*a*_2. Thus, the rotation guiding unit 137*c* rotates counterclockwise due to a force applied by the connection pin 137*e*. When the rotation guiding unit 137*c* rotates counterclockwise, the imaging device 122 disposed on the rotate guiding unit 137*c* also rotates counterclockwise, thereby correcting the shake.

In addition, for example, as illustrated in FIG. 11, if the imaging device 122 is intended to be rotated clockwise in order to correct the shake of the photographing apparatus 100, the controller 131 controls and moves the operating unit 137*b*_1 of the second driving unit 137*b* in a negative direction of the x-axis. When the operating unit 137*b*_1 moves in the negative direction of the x-axis, the link unit 137*d* also moves in the negative direction of the x-axis. Thus, the connection pin 137*e* slides along the inner wall of the slot 137*d*_3, and the rotation guiding unit 137*c* rotates clockwise. That is, the rotation guiding unit 137*c* is bounded by the rotation hole 137*a*_2 so that the rotation guiding unit 137*c* rotates while being inserted into the rotation hole 137*a*_2. Thus, the rotation guiding unit 137*c* rotates clockwise due to a force applied by the connection pin 137*e*. When the rotate guiding unit 137*c* rotates clockwise, the imaging device 122 disposed on the rotation guiding unit 137*c* also rotates clockwise, thereby correcting the shake.

As described above, the photographing apparatus 100 uses a three-axis shake correction method. The method may simultaneously control the motion of the shake correction lens 111*a* and the rotation motion of the imaging device 122 in order to correct the shake. The shake correction can be performed with high accuracy.

The photographing apparatus 100 is a single-lens reflex digital camera. In embodiments, the photographing apparatus 100 may be a compact camera, a video camcorder, or a film camera.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A photographing apparatus comprising:
    at least one shake correction lens configured to permit light incident to a subject to pass through the at least one shake correction lens;
    a first driving unit configured to move the shake correction lens;
    an imaging device configured to convert the incident light that passes through the at least one shake correction lens to an electronic signal;
    a rotating unit configured to rotate the imaging device about an optical axis of the incident light; and
    a controller configured to control the first driving unit and the rotating unit to correct for a shake of the photographing apparatus, wherein the rotating unit comprises:
    a frame having a rotation hole;
    a second driving unit mounted on the frame, and comprising an operating unit configured to move linearly;
    a rotation guiding unit installed in the rotation hole so as to be capable of rotating, wherein the imaging device is mounted on the rotation guiding unit; and
    a link unit connected to the rotation guiding unit, and configured to receive power from the operating unit of the second driving unit to rotate the rotation guiding unit.

2. The photographing apparatus of claim 1, wherein the first driving unit moves the shake correction lens in a perpendicular direction to the optical axis of the incident light.

3. The photographing apparatus of claim 2, wherein the first driving unit comprises a pair of actuators, wherein a portion of each of the pair of actuators is connected to the at least one shake correction lens.

4. The photographing apparatus of claim 1, wherein the first driving unit comprises at least one of: an ultrasonic motor, a voice coil motor or a step motor.

5. The photographing apparatus of claim 1, wherein the imaging device comprises at least one of: a charge coupled device (CCD) or a complementary metal oxide semiconductor (CMOS).

6. The photographing apparatus of claim 1, wherein the second driving unit comprises at least one of an ultrasonic motor, a voice coil motor or a step motor.

7. The photographing apparatus of claim 1, wherein the rotation guiding unit comprises a rotation connection unit connected to the link unit,
    wherein a slot is formed in the link unit, and
    wherein a connection pin installed in the rotation connection unit passes through the slot so that the link unit and the rotation connection unit are connected to each other.

8. The photographing apparatus of claim 7, wherein a linear motion of the link unit is converted to a rotation motion of the rotation guiding unit by the connection pin.

9. The photographing apparatus of claim 1, further comprising at least one sensor unit configured to measure the shake of the photographing apparatus and transmitting a result of the measuring to the controller.

10. The photographing apparatus of claim 9, wherein the at least one sensor unit comprises a gyro sensor measuring rotation motion.

11. A photographing apparatus comprising:
    at least one lens group through which image light is transmitted;
    an imaging device converting the image light transmitted through the lens group to an electronic signal;
    a rotating unit rotating the imaging device about an optical axis of the image light; and
    a controller controlling the rotating unit, wherein the rotating unit comprises:
    a frame comprising a rotation hole;
    a driving unit mounted on the frame, and comprising an operating unit configured to move linearly;
    a rotation guiding unit installed in the rotation hole so as to be capable of rotating, the imaging device mounted on the rotation guiding unit; and
    a link unit connected to the rotating guiding unit, and receiving power from the operating unit of the driving unit to rotate the rotate guiding unit.

12. The photographing apparatus of claim 11, wherein the imaging device comprises at least one of: a CCD or a CMOS.

13. The photographing apparatus of claim 11, wherein the driving unit comprises at least one of an ultrasonic motor, a voice coil motor or a step motor.

14. The photographing apparatus of claim 11, wherein the rotation guiding unit comprises a rotation connection unit connected to the link unit,
    wherein a slot is formed in the link unit, and
    wherein a connection pin installed in the rotation connection unit passes through the slot so that the link unit and the rotation connection unit are connected to each other.

15. The photographing apparatus of claim 14, wherein a linear motion of the link unit is converted to a rotation motion of the rotation guiding unit by the connection pin.

16. The photographing apparatus of claim 11, further comprising at least one sensor unit measuring a shake of the photographing apparatus and transmitting a result of the measuring to the controller.

17. The photographing apparatus of claim 16, wherein the at least one sensor unit comprises a gyro sensor measuring rotary motion.

18. A method on a photographing apparatus, the method comprising:
    sensing shaking of the photographing apparatus;
    compensating for the shaking of the photographing apparatus by rotating an imaging device, the imaging device generating electrical signals from light incident to a subject image; and
    compensating for the shaking of the photographing apparatus by moving a shake correction lens in two directions, wherein light incident to the subject image passes through the shake correction lens and strikes the imaging device, wherein the rotating the imaging device comprises
    driving linearly a driving unit with a link unit connected, wherein the link unit is connected to a rotating guide unit installed in a rotation hole, and wherein the imaging device is mounted on the rotating guide unit, and wherein in response to the driving linearly the driving unit, the link unit is driven linearly which rotates the rotating guide unit.

* * * * *